United States Patent
Singh et al.

(10) Patent No.: US 10,541,912 B2
(45) Date of Patent: Jan. 21, 2020

(54) DETECTING EGRESSES OF A POINT-TO-MULTIPOINT LABEL SWITCHED PATH IN A RING NETWORK

(71) Applicant: Juniper Networks, Inc., Sunnyvale, CA (US)

(72) Inventors: Ravi Singh, San Jose, CA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/986,476

(22) Filed: May 22, 2018

(65) Prior Publication Data

US 2019/0363978 A1 Nov. 28, 2019

(51) Int. Cl.
| | | |
|---|---|---|
| *H04L 12/723* | (2013.01) | |
| *H04L 12/933* | (2013.01) | |
| *H04L 12/755* | (2013.01) | |
| *H04L 12/761* | (2013.01) | |
| *H04L 12/18* | (2006.01) | |
| *H04L 12/42* | (2006.01) | |
| *H04L 12/913* | (2013.01) | |

(52) U.S. Cl.
CPC .......... *H04L 45/50* (2013.01); *H04L 45/021* (2013.01); *H04L 45/16* (2013.01); *H04L 49/102* (2013.01); *H04L 12/185* (2013.01); *H04L 12/422* (2013.01); *H04L 47/724* (2013.01)

(58) Field of Classification Search
None
See application file for complete search history.

(56) References Cited

U.S. PATENT DOCUMENTS

| | | | |
|---|---|---|---|
| 7,990,993 B1 | 8/2011 | Ghosh et al. | |
| 8,050,559 B2 | 11/2011 | Sindhu | |
| 8,948,179 B2 * | 2/2015 | Zhao | H04L 45/42 370/392 |

(Continued)

FOREIGN PATENT DOCUMENTS

| | | |
|---|---|---|
| EP | 2963872 A1 | 5/2017 |
| WO | 2013003981 A1 | 1/2013 |

OTHER PUBLICATIONS

Cain et al. "Internet Group Management Protocol, Version 3" Network Working Group, RFC 3376, Oct. 2002, 53 pp.

(Continued)

*Primary Examiner* — Diane L Lo
(74) *Attorney, Agent, or Firm* — Shumaker & Sieffert, P.A.

(57) ABSTRACT

Techniques are described for detecting egress network devices of a point-to-multipoint (P2MP) label switched path (LSP). For example, a network device may include one or more processors configured to identify a P2MP LSP for receiving multicast traffic from a multicast source for a specific multicast group for which the network device has an interested receiver, wherein the network device is to be an egress network device of the P2MP LSP; and send, to an ingress network device of the P2MP LSP, a P2MP egress identification message to add the network device as an egress network device of the P2MP LSP, wherein the one or more processors are further configured to output the P2MP egress identification message into a multipoint-to-point (MP2P) ring LSP for which the ingress network device of the P2MP LSP is a sole egress network device of the MP2P ring LSP.

27 Claims, 4 Drawing Sheets

(56) References Cited

U.S. PATENT DOCUMENTS

| | | | |
|---|---|---|---|
| 9,413,605 B2* | 8/2016 | Kompella | H04L 41/0668 |
| 10,063,484 B2* | 8/2018 | Chen | H04L 12/4641 |
| 2010/0214909 A1* | 8/2010 | Ceccarelli | H04L 12/437 |
| | | | 370/228 |
| 2014/0362846 A1* | 12/2014 | Li | H04L 45/50 |
| | | | 370/338 |
| 2016/0366051 A1* | 12/2016 | Chen | H04L 45/50 |

OTHER PUBLICATIONS

Deshmukh et al. "RSVP Extensions for RMR" Internet-Draft, Sep. 8, 2017, 30 pp.

Fenner, W. "Internet Group Management Protocol, Version 2" Network Working Group, RFC 2236, Nov. 1997, 24 pp.

Kompella et al. "Resilient MPLS Rings" Internet-Draft, Jul. 2, 2017, 14 pp.

Kompella et al. "Resilient MPLS Rings" Internet-Draft, Jan. 3, 2018 14 pp.

Awduche et al. "RSVP-TE: Extensions to RSVP for LSP Tunnels," Request for Comments 3209, Dec. 2001, 61 pp.

Extended European Search Report dated Jul. 23, 2019 in counterpart EP Application No. 19165378.1, 7 pp.

* cited by examiner

DETECTING EGRESSES OF A POINT-TO-MULTIPOINT LABEL SWITCHED PATH IN A RING NETWORK

TECHNICAL FIELD

The disclosure relates to computer networks and, more particularly, to engineering traffic flows within computer networks.

BACKGROUND

Routing devices within a network, often referred to as routers, maintain routing information that describes available routes through the network. Upon receiving an incoming packet, the router examines information within the packet and forwards the packet in accordance with the routing information. To maintain an accurate representation of the network, routers typically exchange routing information in accordance with one or more defined routing protocols, such as the Border Gateway Protocol (BGP).

Multi-Protocol Label Switching (MPLS) techniques may be used to engineer traffic patterns within Internet Protocol (IP) networks. Using MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path. Routers along the path cooperatively perform MPLS operations to forward the MPLS packets along the established path. A variety of protocols exist for establishing LSPs, such as the Label Distribution Protocol (LDP) and the Resource Reservation Protocol with Traffic Engineering extensions (RSVP-TE).

A plurality of routing devices within a network may be arranged as a ring network. In some examples, a ring network may operate as an access network to customer networks. That is, a ring network may operate to provide fast packet-based transport of communications between customer networks connected to the ring network, and/or provide the customer networks access to public network, such as the Internet or other provider networks.

SUMMARY

In general, techniques are described for detecting egress network devices (e.g., routers) interested in joining a point-to-multipoint (P2MP) label switched path (LSP) in a ring network ("P2MP LSP") to receive multicast traffic. In some examples, a plurality of routers in a ring network may establish one or more unicast multipoint-to-point (MP2P) LSPs ("MP2P ring LSPs"), each terminating at a particular egress router. The egress router of a given MP2P ring LSP may also operate as an ingress router of a P2MP LSP to source packet traffic into a P2MP LSP for transport to one or more egress routers of the P2MP LSP.

To detect egress routers interested in joining the P2MP LSP, the ingress router of the P2MP LSP may receive one or more P2MP egress identification messages from the egress routers. For example, an egress router interested in joining the P2MP LSP may determine that it has a receiver interested in receiving multicast traffic from a multicast source for which the egress router for the MP2P ring LSP is an ingress router to the ring network. The egress router interested in joining the P2MP LSP may send, on a MP2P ring LSP towards the ingress router of the P2MP LSP, a P2MP egress identification message that enables the ingress router of the P2MP LSP to learn the identity of the interested egress router. For example, the P2MP egress identification message may be an Internet Group Management Protocol (IGMP) membership report message.

In response to receiving the P2MP egress identification message, the ingress router of the P2MP LSP may add the interested egress router to the P2MP LSP. In this way, an ingress router for the P2MP LSP may automatically detect egress routers interested in joining the P2MP LSP and learn the Internet Protocol (IP) addresses of the egress routers, without requiring manually configuring the ingress router with information about the interested egress routers. Because the P2MP egress identification message is encapsulated within an MPLS packet injected into the MP2P ring, the intermediate routers around the ring can simply swap the outer MPLS label on the MPLS packet without having to inspect the payload contents of the packet or install control plane state associated with the P2MP egress identification message. Avoiding the creation of control plane state at routers other than the ingress and egress routers of the P2MP LSP may reduce network resource overhead when signaling a P2MP LSP.

In one example, a method includes identifying, by a first network device in a ring network, a point-to-multipoint (P2MP) label switched path (LSP) for receiving multicast traffic from a multicast source for a specific multicast group for which the first network device has an interested receiver, wherein the first network device is to be an egress network device of the P2MP LSP. The method also includes sending, by the first network device to an ingress network device of the P2MP LSP, a P2MP egress identification message to add the first network device as an egress network device of the P2MP LSP, wherein sending the P2MP egress identification message comprises outputting the P2MP egress identification message into a multipoint-to-point (MP2P) ring LSP in the ring network for which the ingress network device of the P2MP LSP is a sole egress network device of the MP2P ring LSP.

In another example, a method includes receiving, by a first network device in a ring network, a point-to-multipoint (P2MP) egress identification message to add a second network device in the ring network as an egress of a P2MP label switched path (LSP) for receiving multicast traffic from a multicast source for a specific multicast group for which the second network device has an interested receiver, wherein receiving the P2MP egress identification message comprises receiving the P2MP egress identification message on a multipoint-to-point (MP2P) ring LSP in the ring network for which the first network device is a sole egress network device of the MP2P ring LSP. The method also includes updating, by the first network device and in response to receiving the P2MP egress identification message on the MP2P ring LSP, stored routing information to add the second network device as an egress network device of the P2MP LSP.

In yet another example, a first network device comprises a plurality of physical interfaces for receiving traffic from two or more network devices of a plurality of network devices in a ring network; one or more processors configured to identify a first point-to-multipoint (P2MP) label switched path (LSP) for receiving multicast traffic from a multicast source for a specific multicast group for which the first network device has an interested receiver, wherein the first network device is to be an egress network device of the first P2MP LSP, and send, to an ingress network device of the P2MP LSP, a first P2MP egress identification message to add the first network device as an egress network device of the first P2MP LSP, wherein to send the first P2MP egress identification message, the processor is further configured to output the first P2MP egress identification message into a multipoint-to-point (MP2P) ring LSP for which the ingress network device of the first P2MP LSP is a sole egress network device of the MP2P ring LSP.

In yet another example, a first network device of a ring network comprises a plurality of physical interfaces for receiving traffic from two or more network devices of a plurality of network devices in a ring network; one or more processors configured to receive a point-to-multipoint (P2MP) egress identification message to add a second network device in the ring network as an egress of a P2MP label switched path (LSP) for receiving multicast traffic from a multicast source for which the second network device has an interested receiver, wherein receiving the P2MP egress identification message comprises receiving the P2MP egress identification message on a multipoint-to-point (MP2P) ring LSP for which the first network device is a sole egress network device of the MP2P ring LSP, and in response to receiving the P2MP egress identification message on the MP2P ring LSP, update stored routing information to add the second network device as an egress network device of the P2MP LSP.

In another example, a computer-readable storage medium of a network device storing instructions that cause a processor to identify a first point-to-multipoint (P2MP) label switched path (LSP) for receiving multicast traffic from a multicast source for which the network device of a ring network has an interested receiver, wherein the network device is to be an egress network device on the first P2MP LSP; and send, to an ingress network device of the first P2MP LSP, a first P2MP egress identification message to add the network device as an egress network device of the first P2MP LSP, wherein to send the first P2MP egress identification message, the processor is further configured to output the first P2MP egress identification message into a multipoint-to-point (MP2P) ring LSP in the ring network for which the ingress network device of the first P2MP LSP is a sole egress network device of the MP2P ring LSP.

The details of one or more embodiments are set forth in the accompanying drawings and the description below. Other features, objects, and advantages will be apparent from the description and drawings, and from the claims.

DETAILED DESCRIPTION

Figure 1:
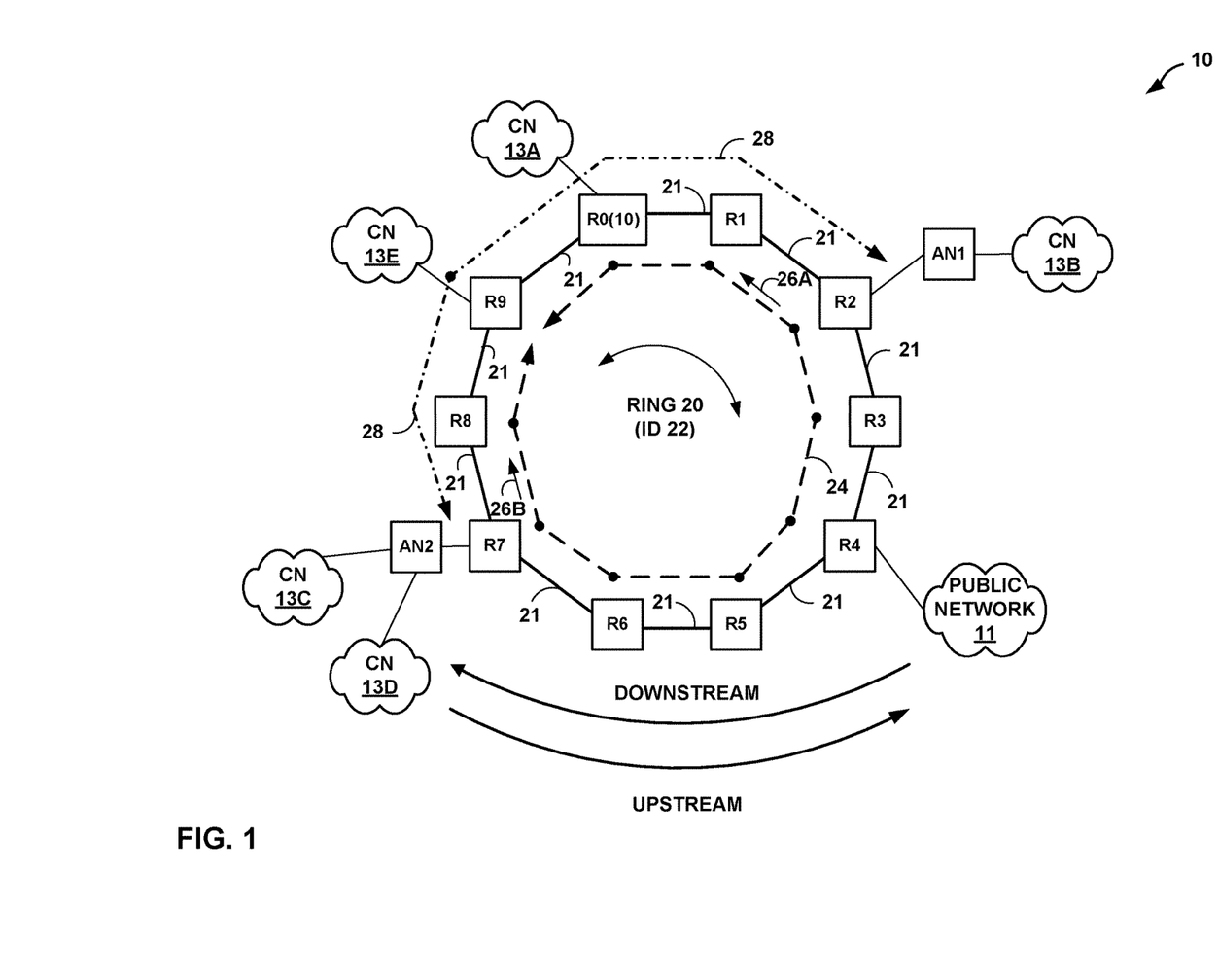
FIG. 1 is a block diagram illustrating an example network system that detects egress routers of a point-to-multipoint (P2MP) LSP in a ring network, in accordance with techniques described herein.

FIG. 1 is a block diagram illustrating an example network system 10 that detects egress routers interested in joining a point-to-multipoint (P2MP) LSP in a ring network (referred to herein as "P2MP LSP"), in accordance with the techniques described herein. As shown in the example of FIG. 1, network system 10 includes a collection of routers ("R"), e.g., R0-R9, that are arranged to form ring network 20. As shown in FIG. 1, ring network 20 operates as an access network for a plurality of customer networks 13A-13E. That is, ring network 20 operates to provide fast packet-based transport of communications between customer networks 13, and/or provide the customer networks access to public network, e.g., public network 11, such as the Internet or other provider networks.

Each of customer networks 13 may comprise a private network and may include local area networks (LANs) or wide area networks (WANs) that comprise a plurality of subscriber devices (not shown). The subscriber devices may include personal computers, laptops, workstations, personal digital assistants (PDAs), wireless devices, network-ready appliances, file servers, print servers or other devices. In some cases, the subscriber devices request and communicate multicast streams.

In general, the routers R0-R9 within ring network 20 use the multi-protocol label switching (MPLS) signaling mechanisms described herein to specify and signal "MPLS rings" and membership therein. As a result, the routers automatically establish label switched paths (LSPs) as components of the MPLS rings for packet transport within ring network 20. These LSPs may be traffic engineered.

As described herein, in example implementations an MPLS ring can be defined as follows. Given a graph G=(V, E), where V is a set of vertices (or nodes) and E a set of directed edges (or links), a ring R, such as ring network 20, is a sequence of nodes <R0, R1, R2, . . . , Rn>, where n is the number of ring nodes in the ring. A ring node is a router; the links are interfaces between routers (e.g., links 21). As used herein, R0 is the hub node for a given MPLS ring, and can also be represented as Rn. That is, the hub node for an MPLS ring is both the zeroth and nth node in the MPLS ring. In the example of FIG. 1, MPLS ring for ring network 20 has a hub node at a respective router R0 that may also be referred to as router R10 (denoted "R0(10)"), since n=10 in the example ring network. For each node i within the sequence of nodes, link (Ri, R(i+1)) and link (R(i+1), Ri) are both in the set of links E. That is, each node in a given MPLS ring is adjacent to the next and previous node in the ring by a pair of bidirectional links. Indices of adjacent nodes in the MPLS ring, other than the hub nodes, differ in this example by an increment of one and increase in a downstream (DS) direction (clockwise in the example of FIG. 1) from hub node R0 to node R(n−1). The other direction is, by way of example, represented as the upstream direction (counterclockwise). For example, in the example of FIG. 1, communications flowing in the downstream direction for the MPLS ring of ring network 20 traverse routers R0-R9 in a clockwise direction as this is the direction in which indices of the routers are defined in increasing order. Additional examples of ring networks are further described in U.S. Pat. No. 9,413,605, entitled "PATH PROTECTION FOR RING-BASED MULTI-PROTOCOL LABEL SWITCHED PATHS," and Kompella, K., et. al., "Resilient MPLS Rings," draft-ietf-mpls-rmr-05, Internet-Draft, Jan. 3, 2018, the entire contents of each of which are incorporated by reference herein.

The MPLS ring for ring network 20 is identified by a ring identifier that is unique across a service provider (SP) network or an administrative domain. In this example of FIG. 1, ring network 20 is assigned ring identifier 22. An MPLS ring may be constructed by assigning a ring identifier and index to each of the nodes that form the MPLS ring, and assigning a ring identifier to links between ring nodes that are to be used to carry traffic for the MPLS ring. In some examples herein, ring links between a pair of ring nodes may be treated as a single link, although these links may be bundled at the layer two (2) (e.g., as a Link Aggregation Group), or explicitly bundled at the layer three (L3) as a link bundle, or implicitly bundled by virtue of having the same ring identifier.

An administrator or network management system may manually define an MPLS ring, such as by assigning a new, unallocated ring identifier, assigning a hub node (e.g., router R0), and assigning the links that belong to the MPLS ring. Routers may also automatically define an MPLS ring by way of discovery using, for example, extensions described herein to an interior gateway protocol (IGP). As one example, IGP may be used to discover ring neighbors and ring interfaces. Based on network topology, each node may autonomously elect or may be configured to specify, which of its individual interfaces are coupled to links that form an MPLS ring being established. Using IGP, for example, each router R0-R9 of ring network 20 declares itself as a member of the MPLS ring and announces its ring identifier for the MPLS ring for which it is a member. Hub router R0 for the MPLS ring also declares, based on discovered neighbors, itself as the largest index in the ring (R0→Rn), which allows the MPLS ring to dynamically form as a closed loop.

In many cases, upon defining an MPLS ring, a service provider network may include other non-ring nodes, such as service nodes and access nodes, that may be attached to, but not be part of, the MPLS rings. In the example of FIG. 1, network system 10 includes access nodes AN1 that is single-homed to router R2 and AN2 that is single-homed to router R7. Although not shown in FIG. 1, other non-ring nodes may be connected to customer networks 13A-13E and public network 11. These non-ring nodes may be one or more hops away from an MPLS ring.

In example implementations, a ring LSP signaled by the routers starts and ends at the same router (or ring node) Ri. As used herein, Ri is an anchor router for the ring LSP, i.e., where the ring LSP starts and ends. Each router is an anchor for one of the n ring LSPs defined on a ring with n nodes. Each anchor node creates an LSP addressed to itself. This ring LSP may contain a pair of counter-rotating unicast LSPs.

One example of a ring LSP described herein is a MP2P ring LSP that starts and ends on the same ring node of an MPLS ring, called the ring LSP anchor, and only traverses the routers of the MPLS ring. In the example of FIG. 1, the MPLS ring constructed for ring network 20 includes a multi-point-to-point (MP2P) ring LSP 24 that starts and ends with router R9. That is, MP2P ring LSP 24 comprises two counter-rotating unicast LSPs in which router R9 is the egress. Traffic may enter ring network 20 from any of routers R0-R8, and is sent towards egress router R9 either in a clockwise direction or counter-clockwise direction, or both, on MP2P ring LSP 24. Although FIG. 1 is illustrated with a single MP2P ring LSP, each router within a MPLS ring can initiate setup of one or more MP2P ring LSPs, each of the MP2P ring LSPs having a different ring LSP identifier.

When establishing one or more ring LSPs of ring network 20, each of routers R0-R9 learns, either through auto-discovery described above or configuration, that it is a router of a defined ring. Each of routers R0-R9 is able to learn the index for other routers on the ring and is able to autonomously select the interfaces and links to be used for the ring.

In addition, each of routers R0-R9 autonomously signals each individual ring LSP of the ring network. For example, router R9 may use a resource reservation protocol such as the Resource Reservation Protocol with Traffic Engineering extensions (RSVP-TE) to establish MP2P ring LSP 24 that extends from all of routers R0-R8 to egress router R9. Further examples of RSVP-TE are described in D. Awduche et. al, "RSVP-TE: Extensions to RSVP for LSP Tunnels," Request for Comments 3209, December 2001, the entire contents being incorporated by reference herein. Router R9 may use RSVP-TE to maintain routing communication sessions with peer routers (e.g., routers R0-R8) and output control-plane messages, e.g., RSVP PATH messages and RSVP RESV messages, to signal membership of ring LSPs. For illustrative purposes, FIG. 1 is described with respect to the RSVP-TE protocol, but routers R0-R9 may use non-resource reservation protocol mechanisms, e.g., Label Distribution Protocol (LDP), for establishing the MP2P ring LSP 24.

In signaling MP2P ring LSP 24, router R9 may create two path messages traveling in opposite directions. That is, resource reservation request messages, e.g., RSVP PATH messages, are sent in a downstream direction (clockwise and counter-clockwise) and contain a corresponding upstream label for the advertising router and any traffic specification (TSPEC) for the data to be carried by the ring LSP. In this way, the RSVP PATH messages automatically create the upstream LSP of the bidirectional ring LSP, e.g., MP2P ring LSP 24. RSVP RESV messages are automatically issued by each router of the ring network and are sent in the upstream direction. The RSVP RESV messages may advertise a downstream label for the sending router, include an upstream TSPEC, and automatically create the downstream LSP of MP2P ring LSP 24. Additional examples of configuration of ring networks are further described in Deshmukh, A., et. al., "RSVP Extensions for RMR," draft-deshmukh-mpls-rsvp-rmr-extension-01, Internet-Draft, Sep. 8, 2017, the entire contents of which is incorporated by reference herein.

In the example of FIG. 1, router R9 may operate as a sole egress router of the MP2P ring LSP 24. Since, in this example implementation, MP2P ring LSP 24 is a bidirectional, multipoint-to-point LSP, MP2P ring LSP 24 allows any of the routers (e.g., R0-R8) within ring network 20 to operate as an ingress to source packet traffic into the MP2P ring LSP 24 for transporting to egress router R9 in an upstream direction and/or downstream direction around ring network 20. For example, downstream traffic being added to the ring may arrive at any of routers R0-R8 from non-ring nodes connected to those routers. Downstream traffic arrives at each router in ring network 20 from its upstream neighbor on one or more interfaces selected as components of the ring. Egress router R9 of MP2P ring LSP 24 receives all of the traffic from its upstream neighbors and sends the traffic to non-ring nodes connected to and reachable through router R9 (e.g., customer network 13E).

Although ring network 20 is illustrated as including a single MP2P ring LSP 24, ring network 20 may, in some examples, include multiple MP2P rings. In this case, each of the MP2P rings have its own set of ring LSPs terminating on the relevant nodes acting as egress routers. For example, a second MP2P ring LSP (not shown) may be established with R2-R4 in which the second MP2P ring LSP terminates on an egress router (e.g., R2) for the second MP2P ring LSP.

In some examples, router R9 may also operate as an ingress router to a P2MP LSP, e.g., P2MP LSP 28, to source packet traffic into the P2MP LSP for transporting to one or more egress routers in ring network 20. Unlike systems in which a point-to-multipoint ring LSP is configured manually or with a more heavy-weight signaling mechanism such as a routing protocol like BGP, which would require storing state and control plane involvement at each intermediate router on the ring, the techniques described herein describe an ingress router of an MP2P ring LSP detecting one or more egress routers interested in joining a P2MP LSP with less configuration overhead.

In accordance with the techniques described herein, ingress router R9 may detect one or more egress routers interested in joining a P2MP LSP by learning, for example, IP addresses of the interested egress routers and by receiving P2MP egress identification messages indicating the IP addresses of the interested egress devices. As further described below, one or more ingress routers of MP2P ring LSP 24 interested in becoming egress routers of P2MP LSP 28 may output respective P2MP egress identification messages on the MP2P ring LSP 24 towards egress router R9 indicating their request to join P2MP LSP 28.

As one example, a network device ("interested receiver") not on ring network 20 and coupled to customer network 13B (e.g., AN1) may request to receive multicast traffic for which router R9 is an ingress. In some examples, router R2 may receive a message from interested receiver AN1 indicating AN1 is interested in receiving the multicast traffic. In some examples, router R2 may receive an IGMP membership report message according to the IGMP protocol from interested receiver AN1 that indicates its interest in receiving the multicast traffic. In some examples, router R2 may use IGMP proxy to send unsolicited IGMP membership report messages on R2's upstream interface(s) on behalf of AN1 to ingress router R9 of the P2MP LSP 28. In this way, R2 performs a host portion of the IGMP task on its upstream interface. In some examples, router R2 may receive a Protocol Independent Multicast (PIM) message according to the PIM protocol from interested receiver AN1 that indicates its interest in receiving the multicast traffic. In any event, router R2 may determine that the receiver AN1 is interested in receiving multicast traffic from a multicast source for which router R9 is an ingress of the P2MP LSP 28.

In response to receiving the message from the interested receiver, router R2 may then construct a P2MP egress identification message 26A that indicates router R2's interest in joining the P2MP LSP 28 as an egress router. For example, router R2 may encapsulate P2MP egress identification message 26A within an MPLS packet bearing an outer MPLS label associated with MP2P ring LSP 24. P2MP egress identification messages may, for example, comprise an IGMP membership report message, or any other messages capable of informing an ingress router of a P2MP LSP of a router's desire to join the P2MP LSP.

Router R2 may send the P2MP egress identification message 26A towards router R9. For example, router R2 may output the P2MP egress identification message 26A into the MP2P ring LSP 24 for which router R9 is a sole egress router of MP2P ring LSP 24. Because the P2MP egress identification message is encapsulated within an MPLS packet injected into the MP2P ring, the intermediate routers around the ring can simply swap the outer MPLS label on the MPLS packet without having to inspect the payload contents of the packet or store any new routing state.

Router R9 may receive the P2MP egress identification messages 26A from router R2 on the MP2P ring LSP 24 and may add router R2 as an egress router of the P2MP LSP 28. For example, in response to receiving the P2MP egress identification message 26A on MP2P ring LSP 24 from router R2, router R9 may determine from the source IP address of the P2MP egress identification message 26A that router R2 sourced the P2MP egress identification message 26A. Router R9 may update stored routing information to add router R2 as an egress router of the P2MP LSP 28.

Another interested receiver not on ring network 20 and coupled to customer network 13D may also request to receive multicast traffic for which router R9 is an ingress. Router R7 may determine that the receiver is interested in receiving multicast traffic from a multicast source for which router R9 is an ingress of the P2MP LSP 28.

Router R7 may then construct a P2MP egress identification message 26B that indicates router R7's interest in joining the P2MP LSP 28 as an egress router. For example, router R7 may encapsulate the P2MP egress identification message 26B within an MPLS packet bearing an outer MPLS label associated with MP2P ring LSP 24.

Router R2 may send the P2MP egress identification message 26B encapsulated within an MPLS packet towards router R9 by outputting the P2MP egress identification message 26B into the MP2P ring LSP 24 for which router R9 is a sole egress router of MP2P ring LSP 24.

Router R9 may receive the P2MP egress identification message 26B from router R7 on the MP2P ring LSP 24 and may add router R7 as an egress router of the P2MP LSP 28. For example, in response to receiving the P2MP egress identification message 26B on MP2P ring LSP 24 from router R7, router R9 may determine from the source IP address of the P2MP egress identification message 26B that router R7 sourced the P2MP egress identification message 26B.

In response to adding routers R2 and R7 as egress routers of the P2MP LSP 28, router R9 may signal (e.g., by sending RSVP PATH messages) the P2MP LSP 28 with routers R2 and R7 as egress routers.

When either router R2 or R7 no longer is operating as an egress router to P2MP LSP 28, that is, R2 or R7 receives message(s) from its interested receiver(s) and no longer has any interested receivers for the multicast source and group associated with P2MP LSP 28, router R2 or R7 may send an indication message (e.g., IGMPv2 or IGMPv3 Leave message) to leave, the P2MP LSP, to router R9 of P2MP LSP 28. For example, router R2 may send an IGMP leave message over MP2P ring LSP 24 for which router R9 is the egress.

In this way, ingress router R9 of P2MP LSP 28 may detect egress routers, e.g., egress routers R2 and R7, interested in joining P2MP LSP 28 without explicit configuration and without having to create control-plane state at routers other than ingress router R9 and egress routers R2 and R7, thereby reducing configuration overhead for configuring P2MP LSP 28.

Figure 2:
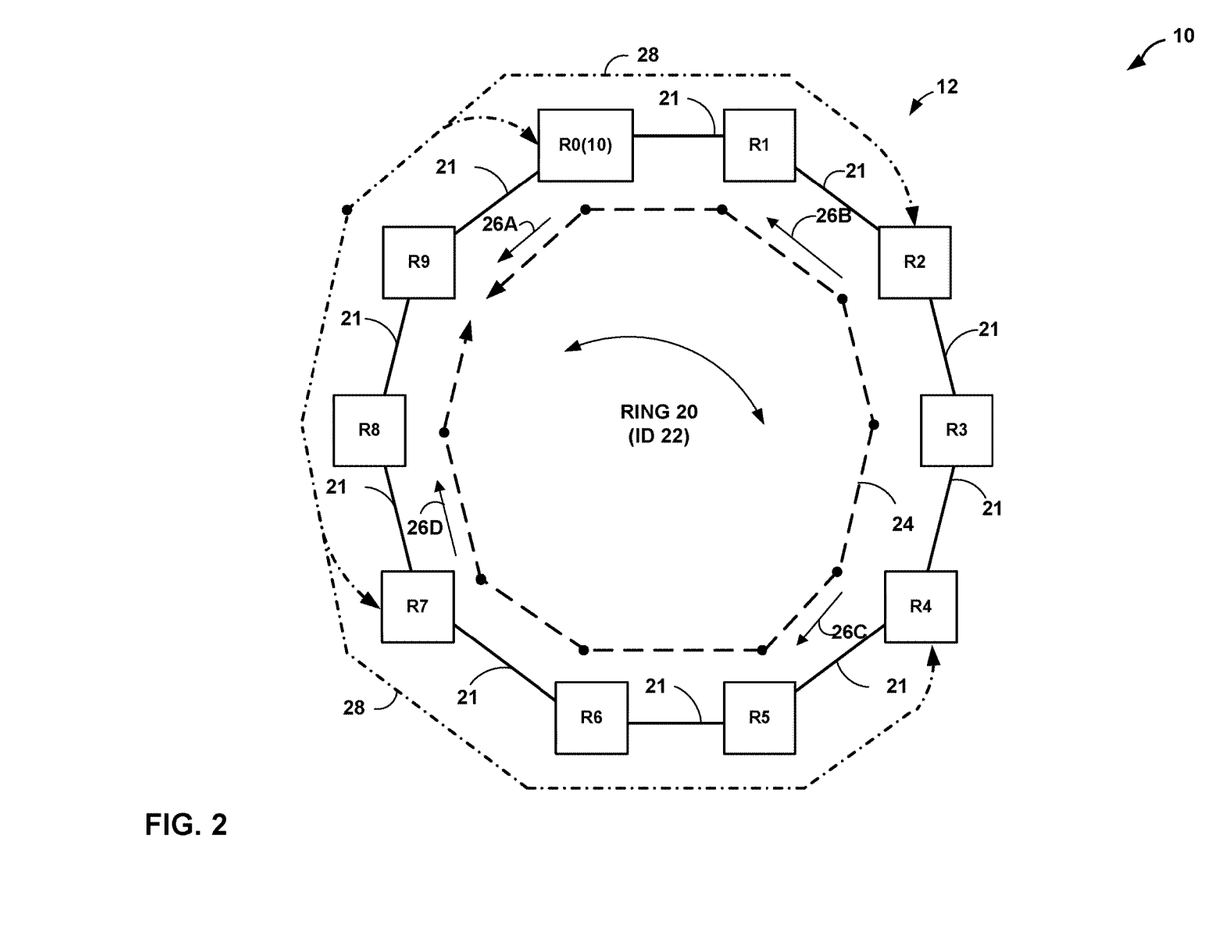
FIG. 2 is a block diagram illustrating another example of detecting a plurality of egress routers interested in joining a P2MP LSP, in accordance with the techniques described herein.

FIG. 2 is a block diagram illustrating another example of detecting one or more egress routers interested in joining a P2MP LSP, in accordance with the techniques described herein. Ring network 20 of FIG. 2 is similar to ring network 20 of FIG. 1 except as described below. FIG. 2 illustrates ring network 20 having a MP2P ring LSP 24 for which router R9 is the sole egress. Routers R0-R8 are each able to source packet traffic, i.e., operate as an ingress router, for MP2P ring LSP 24. Although not shown in FIG. 2, a similar corresponding ring LSP can be automatically created for each of the other respective routers R0-R8.

In the example of FIG. 2, routers R0, R2, R4, and R7 (collectively referred to herein as "potential P2MP egress routers") may each identify one or more respective interested receiver(s) for receiving multicast traffic from a multicast source for a specific multicast group for which router R9 is an ingress router of a P2MP LSP 28. The potential egress routers may each send a corresponding P2MP egress identification message, e.g., P2MP egress identification messages 26A-26D (collectively, "P2MP egress identification messages 26"), towards router R9 such that router R9 may add the routers R0, R2, R4, and R7 as egress routers to P2MP LSP 28.

In the example of FIG. 2, router R0 may construct a P2MP egress identification message 26A and send the P2MP egress identification message 26A towards router R9 such that router R9 may add router R0 as an egress to P2MP LSP 28. For example, router R0 may encapsulate the P2MP egress identification message 26A within an MPLS packet bearing an outer MPLS label associated with the MP2P ring LSP 24, and may output the P2MP egress identification message 26A into the MP2P ring LSP 24.

Router R9 may, as the sole egress of the MP2P ring LSP 24, receive the P2MP egress identification message 26A from router R0 and may add router R0 as an egress router of the P2MP LSP 28. For example, in response to receiving the P2MP egress identification message 26A, router R9 may determine from the source address of P2MP egress identification message 26A, that router R0 sent P2MP egress identification message 26A. Router R9 may update stored routing information to add router R0 as an egress router of the P2MP LSP 28.

In some examples, P2MP LSP 28 is not yet established. In this example, egress router R9 may wait to signal (e.g., by sending RSVP PATH messages) the P2MP LSP 28 until router R9 receives at least two or more P2MP egress identification messages.

Router R2 may then construct a P2MP egress identification message 26B and send the P2MP egress identification message 26B towards router R9 such that router R9 may add router R2 as an egress to P2MP LSP 28. For example, router R2 may encapsulate the P2MP egress identification message 26B within an MPLS packet bearing an outer MPLS label associated with the MP2P ring LSP 24, and may output the P2MP egress identification message 26B into the MP2P ring LSP 24.

Router R9 may, as the sole egress of the MP2P ring LSP 24, receive the P2MP egress identification message 26B from router R2 and may add router R2 as an egress router of the P2MP LSP 28. For example, in response to receiving the P2MP egress identification message 26B, router R9 may determine from the source address of P2MP egress identification message 26B, that router R2 sent P2MP egress identification message 26B. Router R9 may update stored routing information to add router R2 as an egress router of the P2MP LSP 28.

In this example, egress router R9 may signal (e.g., by sending RSVP PATH messages) the P2MP LSP 28 because router R9 has received at least two or more P2MP egress identification messages (e.g., P2MP egress identification messages 26A and 26B). In this example, router R9 may select a direction (e.g., clockwise or counter-clockwise) on which to send P2MP data traffic around ring network 20 to routers R0 and R2, and send corresponding new resource reservation request messages (e.g., RSVP-TE PATH messages) toward routers R0 and R2 in the selected direction to signal adding a branch to the P2MP LSP 28 that brings traffic to routers R0 and R2, respectively.

Router R9 may decide to send multicast traffic in the clockwise direction, the counter-clockwise direction, or both. If router R9 determines to send multicast traffic in the clockwise direction, router R9 may send a single new resource reservation request message in the clockwise direction. Alternatively, if router R9 determines to send multicast traffic in the counter-clockwise direction, router R9 may send a single new P2MP resource reservation request message in the counter-clockwise direction. If router R9 determines to send multicast traffic in both clockwise and counter-clockwise directions, router R9 may send corresponding new P2MP resource reservation request messages in each direction, i.e., one RSVP-TE PATH message in the clockwise direction and another RSVP-TE PATH message in the counter-clockwise direction.

In the example of FIG. 2, when routers R0 and R2 each receives the corresponding RSVP-TE PATH message(s), routers R0 and R2 may determine from an object whether the router needs to send an RSVP-TE RESV message for the P2MP LSP 28. In some examples, the RSVP-TE PATH message may include an object that indicates the path to which the RSVP-TE PATH message corresponds. For example, this object may include information about the multicast source and group.

Router R9 may receive an RSVP-TE RESV message from each of routers R0 and R2. In response, router R9 may complete establishment of the P2MP LSP 28 to routers R0 and R2.

In another example, router R4 may construct a P2MP egress identification message 26C and send the P2MP egress identification message 26C towards router R9 such that router R9 may add router R4 as an egress to P2MP LSP 28. For example, router R4 may encapsulate the P2MP egress identification message 26C within an MPLS packet bearing an outer MPLS label associated with the MP2P ring LSP 24, and may output the P2MP egress identification message 26C into the MP2P ring LSP 24.

Router R9 may, as the sole egress of the MP2P ring LSP 24, receive the P2MP egress identification message 26C from router R4 and may add router R4 as an egress router of the P2MP LSP 28. For example, in response to receiving the P2MP egress identification message 26C, router R9 may determine from the source address of P2MP egress identification message 26C, that router R4 sent P2MP egress identification message 26C. Router R9 may update stored routing information to add router R4 as an egress router of the P2MP LSP 28.

In some examples, at the time R9 receives P2MP egress identification message 26C from router R4, P2MP LSP 28 may already have been established in response to receiving P2MP egress identification messages 26A and 26B. In this example, router R9 may select a direction (e.g., as described above) on which to send traffic around ring network 20 to the new egress router R4, and send a new resource reservation request message (e.g., RSVP-TE PATH message) toward router R4 in the selected direction to signal adding a branch to the P2MP LSP 28 that brings traffic to router R4.

In another example, router R7 may send a P2MP egress identification message 26D towards router R9 such that router R9 may add router R7 as an egress to P2MP LSP 28. For example, router R7 may encapsulate the P2MP egress identification message 26D within an MPLS packet bearing an outer MPLS label associated with the MP2P ring LSP 24, and may output the P2MP egress identification message 26D into the MP2P ring LSP 24.

Router R9 may, as the sole egress of the MP2P ring LSP 24, receive the P2MP egress identification message 26D from router R7 and may add router R7 as an egress router of the P2MP LSP 28. For example, in response to receiving the P2MP egress identification message 26D, router R9 may determine from the source address of P2MP egress identification message 26D, that router R7 sent P2MP egress identification message 26D. Router R9 may update stored routing information to add router R7 as an egress router of the P2MP LSP 28.

In some examples, at the time R9 receives P2MP egress identification message 26D from router R7, P2MP LSP 28 may already have been established in response to receiving P2MP egress identification messages 26A, 26B, and/or 26C. In this example, router R9 may select a direction (e.g., as described above) on which to send traffic around ring network 20 to router R7, and send a new resource reservation request message (e.g., RSVP-TE PATH message) toward router R7 in the selected direction to signal adding a branch to the P2MP LSP 28 that brings traffic to router R7.

Figure 3:
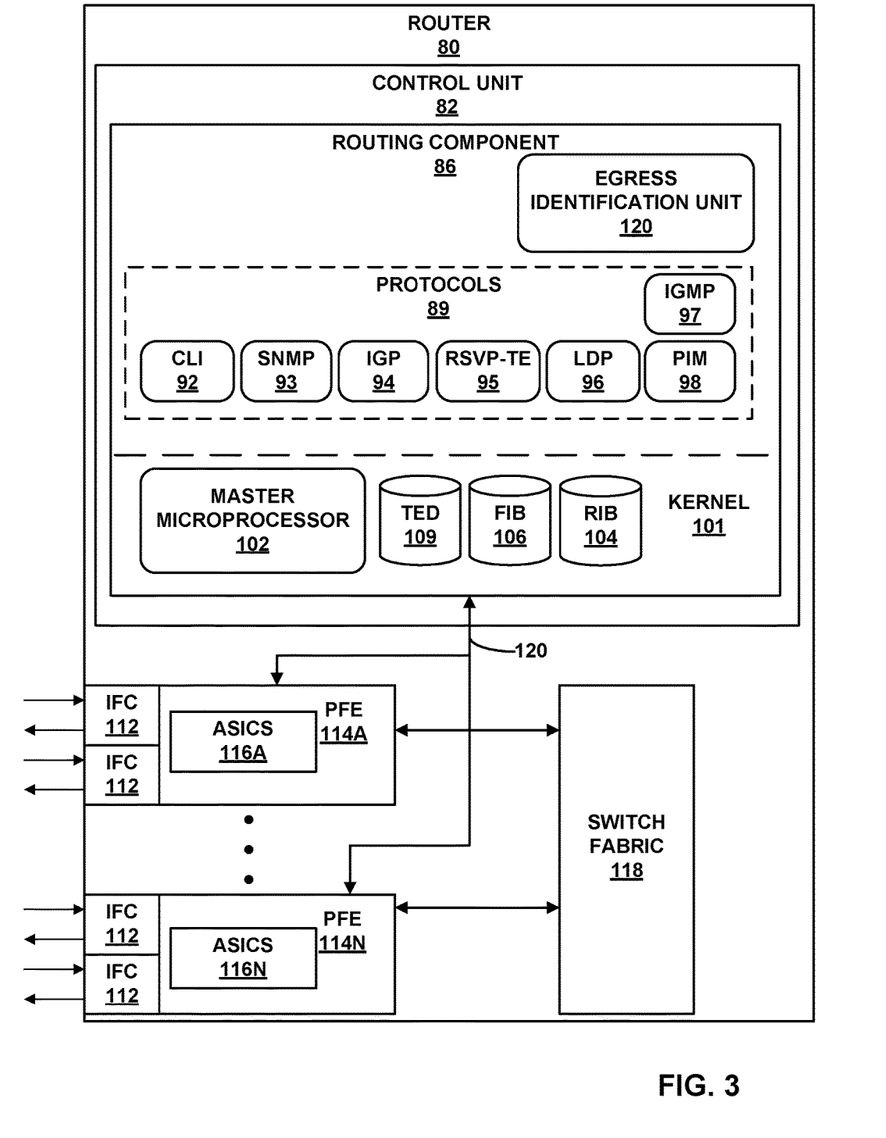
FIG. 3 is a block diagram illustrating an exemplary device, e.g., a router or gateway, capable of implementing the techniques described herein.

FIG. 3 is a block diagram illustrating an example device, e.g., a router or gateway, capable of implementing the techniques described herein. Router 80 may comprise any router in a network, such as network system 10. For example, router 80 may comprise a gateway, an edge or access router, a core router or other device illustrated herein that forwards MPLS traffic using ring LSPs in accordance with the techniques described herein.

In the example of FIG. 3, router 80 includes control unit 82 in which routing component 86 provides control plane functionality for router 80. Router 80 also includes a plurality of packet processors, such as packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 120 may comprise a Gigabit Ethernet connection. Switch fabric 118 provides a high-speed interconnect for forwarding incoming data packets between PFEs 114 for transmission over a network. U.S. Pat. No. 8,050,559, entitled "MULTI-CHASSIS ROUTER WITH MULTIPLEXED OPTICAL INTERCONNECTS," describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 93 ("SNMP 93") comprises an SNMP agent that receives SNMP commands from a management entity to set and retrieve configuration and management information for router 80. Using CLI 92 and SNMP 93, management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106 in accordance with the routing information. In some examples, router 80 may also maintain a label FIB storing MPLS labels, which may be a separate data structure or part of FIB 106. In general, the routing information represents the overall topology of the network. IGP 94 interacts with kernel 101 (e.g., by way of Application Programming Interface (API) calls) to update RIB 104 based on routing protocol messages received by router 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network.

Routing component 86 also provides an operating environment of one or more traffic engineering protocols to establish tunnels for forwarding subscriber packets through the ordered set of service nodes associated with different service chains. For example, RSVP-TE 95 may execute the Resource Reservation Protocol with Traffic Engineering extensions to exchange traffic engineering (TE) information, such as MPLS labels for enabling label-based packet forwarding. Routing component 86 may, as another example, execute the Label Distribution Protocol 96 to signal MPLS rings and ring LSPs as described herein. As another example, routing component 86 may use GRE or IP-based tunneling protocols to establish traffic engineered tunnels. Routing component 86 may maintain, for example, a traffic engineering database (TED) 109 to store the traffic engineering data.

RSVP-TE 95 may maintain routing communication sessions with peer routers and output control-plane signaling messages, such as resource reservation request messages and resource reservation reply messages e.g., RSVP PATH messages and RSVP RESV messages as described herein to signal membership of ring LSPs (e.g., MP2P ring LSP 24 of FIG. 1). Moreover, RSVP-TE 95 may program RIB 104 and/or FIB 106 with forwarding labels for LSP rings as learned from the peer router, which in turn causes kernel 101 to program forwarding ASICS 116 with primary and backup forward entries for forwarding MPLS traffic as described herein. In some examples, RSVP-TE 95 may implement automatic bandwidth management functions for LSP rings based on provisioning information received via CLI 92 or SNMP 93, for example. In addition, or alternatively, LDP 96 may perform these functions. IGP 94 may be extended for auto-discovery of MPLS rings and ring LSPs.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of router 80. In some instances, routing component 86 may derive separate and different software FIBs for each respective PFEs 114. In addition, one or more of PFEs 114 include application-specific integrated circuits (ASICs) 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 95 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein. Example details of an example router in which a processor programs one or more forwarding components are provided in U.S. Pat. No. 7,990,993, the contents of which being incorporated herein by reference in its entirety.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 30, an egress interface or other components of router 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the way a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate packets in accordance with the forwarding information.

Router 80 may include an egress identification unit 120 that operates in accordance with the techniques described herein. In some examples in which router 80 may represent egress routers (e.g., routers R0, R2, R4, and/or R7 of FIG. 2) interested in joining P2MP LSP 28, router 80 may include an egress identification unit 120 for constructing and sending a P2MP egress identification message to add router 80 as an egress router of the P2MP LSP. For example, router 80 may determine that it has a receiver interested in receiving multicast traffic from a multicast source for which router R9 is the ingress router of P2MP LSP 28. For example, router 80 may implement IGMP 97 and may receive from a non-ring interested receiver of customer network 13B an IGMP membership report message indicating that the non-ring receiver is interested in receiving multicast traffic from a multicast source for which router R9 is an ingress router of a P2MP LSP 28. Alternatively, or additionally, router 80 may implement PIM 98 and may receive from a non-ring interested receiver of customer network 13B a PIM join message indicating that the non-ring receiver is interested in receiving multicast traffic from a multicast source for which router R9 is an ingress router of a P2MP LSP 28. Router 80 may store a data structure (not shown) that includes a mapping of the multicast source and group to the P2MP LSP 28, and may perform a lookup of the data structure of the multicast group (and source) indicated in the received IGMP membership report message or PIM join message, to identify the P2MP LSP 28 for which the non-ring receiver is to receive traffic form the multicast source. In some examples, the data structure may map multiple different multicast source and group pairs to respective different P2MP LSPs that exist on a ring network.

In response, egress identification unit 120 may, for example, generate a P2MP egress identification message to inform router R9 that router 80 requests to join the P2MP LSP 28 as an egress router. For example, egress identification unit 120 may use IGMP 97 to generate an IGMP membership report message to inform router R9 to add router 80 as an egress router of the P2MP LSP 28. In some examples, router 80 may use IGMP proxy in accordance with IGMP 97 router 80 may send unsolicited IGMP membership report messages on behalf of its hosts (e.g., customer edge routers or access nodes) to ingress router R9 of the P2MP LSP 28.

Egress identification unit 120 may encapsulate the P2MP egress identification message (e.g., IGMP membership report message) within an MPLS packet bearing an outer MPLS label associated with the MP2P ring LSP 24. For example, egress identification unit 120 may lookup the RIB 104 and/or FIB 106 to determine the MPLS label associated with MP2P ring LSP 24. Egress identification unit 120 may instruct router 80 to send the P2MP egress identification message to ingress router R9 of MP2P ring LSP 28 by outputting the P2MP egress identification message into MP2P ring LSP 24 for which router R9 is the sole egress router of MP2P ring LSP 24.

Egress identification unit 120 may also, in some examples, determine that router 80 no longer has any interested egress routers of the P2MP LSP 28. For example, when router 80 no longer has any interested receivers for a multicast group (e.g., by receiving IGMP or PIM messages indicating the desire of receivers leaving the group), egress identification unit 120 may look up ingress router R9 for the multicast source and group and send a P2MP leave message (e.g., an IGMP or PIM leave message) into the MP2P ring LSP 24 for which router R9 is the sole egress.

In some examples in which router 80 is an ingress of a P2MP LSP 28 receiving P2MP egress identification messages, e.g., router R9 of FIG. 2, egress identification unit 120 is configured to determine an IP address of one or more interested egress routers of the P2MP LSP 28 from one or more P2MP egress identification messages. For example, in response to receiving one or more P2MP egress identification messages, egress identification unit 120 may determine, from the source IP addresses in the P2MP egress identification messages, the interested egress routers. Egress identification unit 120 may update stored routing information, e.g., RIB 104 and FIB 106, to add the new egress router as an egress router of the P2MP LSP 28. More specifically, in some examples, egress identification unit 120 may invoke RSVP-TE 95 to send a resource reservation request message (e.g., an RSVP-TE PATH message) to signal a new branch to P2MP LSP 28 to the new egress router, and in turn may receive a resource reservation reply message (e.g., an RSVP-TE RESV message) indicating that resources have been reserved for the new branch of P2MP LSP 28. In some examples, before sending the resource reservation request message to add the new egress router as an egress of P2MP LSP 28, egress identification unit 120 may determine a direction on ring network 20 for which the send the resource reservation request message. For example, egress identification unit 120 may select a direction of a ring network (e.g., clockwise or counter-clockwise) over which to send the resource reservation request message in response to receiving the P2MP egress identification message.

Egress identification unit 120 of router 80 may determine that egress routers in the ring network desire to leave the P2MP LSP 28. In this example, router 80 may receive a P2MP leave message on the MP2P ring LSP 24. Egress identification unit 120 of router 80 may update FIB 106 and/or RIB 104 to remove the branch of the P2MP LSP 28 that goes to the egress router (e.g., router R2). Router 80 may send, for example, an RSVP PATH TEAR message to tear down the branch of the P2MP LSP 28 associated with egress router R2, and no longer forwards multicast traffic for the P2MP LSP 28 to egress router R2.

The architecture of router 80 illustrated in FIG. 3 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, processing circuitry, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
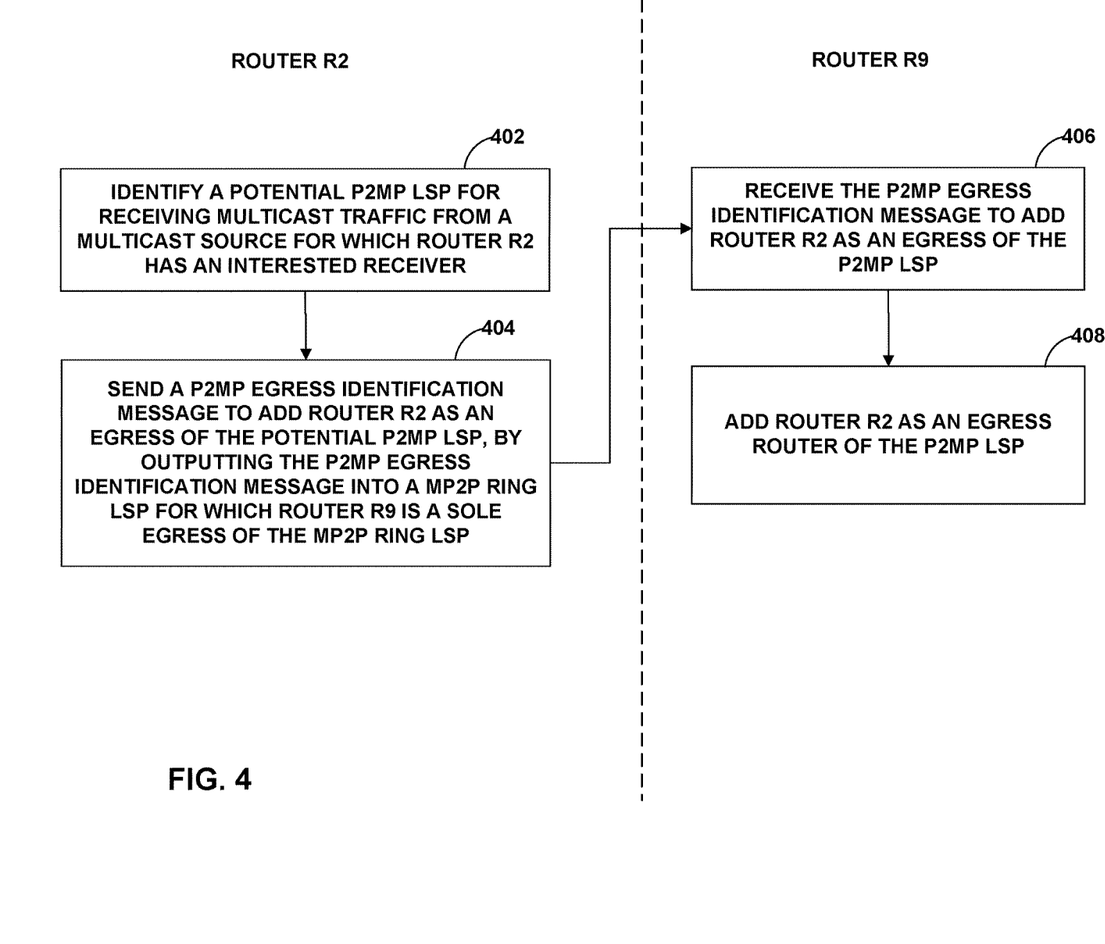
FIG. 4 is a flowchart illustrating example operation of network devices in accordance with the techniques described herein.

FIG. 4 is a flowchart illustrating example operation of a network device, such as a router, in accordance with the techniques described herein. Although FIG. 4 is described with respect to router R2 and R9 of FIGS. 1 and 2 and router 80 of FIG. 3, the flowchart is applicable to any router in a ring network.

The router executes a routing protocol, such as IGP, to discover, using the IGP, neighboring routers that are also designated as members of a MPLS ring associated with a ring network. For example, the router may receive enhanced IGP messages from two or more of the routers and select, based on the indexes within the enhanced IGP messages, an upstream neighboring one of the routers and a downstream neighboring one of the routers for the ring LSPs of the MPLS ring.

Responsive to discovering the neighboring routers that are members of the MPLS ring, the router establishes an MP2P ring LSP, e.g., MP2P ring LSP 24, for the MPLS ring. MP2P ring LSP 24 is configured to transport MPLS packets around the ring network to a different one of the routers that is designated as a sole egress router for the respective ring LSP. For example, router R9 is designated an egress router for MP2P ring LSP 24. Any of the routers within the ring network can operate as an ingress to source packet traffic into MP2P ring LSP 24 for transport to egress router R9.

In some examples, egress router R9 of MP2P ring LSP 24 may operate as an ingress router of a P2MP LSP. In this example, an egress router, e.g., router R2, may identify a P2MP LSP (e.g., P2MP LSP 28) for receiving multicast traffic from a multicast source and group for which router R2 has an interested receiver and router R9 is an ingress router of the P2MP LSP (402). For example, router R2 may implement IGMP and may receive one or more IGMP membership report messages from a non-ring receiver (or from a proxy) that indicates the non-ring receiver is interested in receiving multicast traffic from a multicast source for which router R9 is the ingress router, where the IGMP membership report message indicates the multicast source. Alternatively, or additionally, router R2 may implement PIM and may receive one or more PIM join messages that specify a source and group from a non-ring receiver interested in receiving multicast traffic from a multicast source for which router R9 is the ingress router, where the PIM message indicates the multicast source.

Router R2 may send, via an egress identification unit 120 of FIG. 3, a P2MP egress identification message as a request to add router R2 as an egress of the P2MP LSP. To send the P2MP egress identification message, router R2 outputs the P2MP egress identification message into MP2P ring LSP 24 for which router R9 is a sole egress of the MP2P ring LSP 24 (404). For example, the egress identification unit 120 of router R2 may instruct router R2 to encapsulate an MPLS label associated with the MP2P ring LSP 24. For instance, router R2 may encapsulate the P2MP egress identification message within an MPLS packet bearing an outer MPLS label associated with the MP2P ring LSP. Router R2 may then output the P2MP egress identification message into the MP2P ring LSP 24 for which router R9 is the sole egress of the MP2P ring LSP 24.

Router R9 may receive on the MP2P ring LSP 24 the P2MP egress identification message to add router R2 as an egress of the P2MP LSP 28 (406). As the sole egress router of the MP2P ring LSP 24, router R9 may receive one or more P2MP egress identification messages on the MP2P ring LSP 24 from routers interested in joining the P2MP LSP 28 as an egress router.

In response to receiving the P2MP egress identification message, router R9 adds router R2 as an egress router of the P2MP LSP 28 (408). For example, router R9 may determine from the source address of the P2MP egress identification message that the P2MP egress identification message is sourced from router R2. Router R9 may update its RIB and/or FIB to add router R2 as an egress router of the P2MP LSP 28. Router R9 may then signal the P2MP LSP 28. For example, egress identification unit 120 of router R9 may invoke RSVP-TE to send a resource reservation request message (e.g., an RSVP-TE PATH message) to signal a new branch to P2MP LSP 28 to the new egress router, and in turn may receive a resource reservation reply message (e.g., an RSVP-TE RESV message) indicating that hops along the path have reserved resources and stored MPLS label state for the new branch of P2MP LSP 28. Ingress router R9 may subsequently send multicast traffic it receives from the multicast source onto the P2MP LSP 28, and routers along the new branch forward the multicast traffic along the path until the multicast traffic reaches the new egress router (e.g., router R2).

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other medium that can be used to store desired program code in the form of instructions or data structures and that can be accessed by a computer. The term "computer-readable storage media" refers to non-transitory, tangible storage media, and not connections, carrier waves, signals, or other transitory media.

Various examples have been described. These and other examples are within the scope of the following claims.

What is claimed is:

1. A method comprising:
   identifying, by a first network device in a ring network, a point-to-multipoint (P2MP) label switched path (LSP) for receiving multicast traffic from a multicast source for a specific multicast group for which the first network device has an interested receiver, wherein the first network device is to be an egress network device of the P2MP LSP; and
   sending, by the first network device to an ingress network device of the P2MP LSP, a P2MP egress identification message to add the first network device as an egress network device of the P2MP LSP, wherein sending the P2MP egress identification message comprises outputting the P2MP egress identification message into a multipoint-to-point (MP2P) ring LSP in the ring network for which the ingress network device of the P2MP LSP is a sole egress network device of the MP2P ring LSP.

2. The method of claim 1, wherein sending the P2MP egress identification message further comprises encapsulating the P2MP egress identification message within an MPLS packet bearing an outer MPLS label associated with the MP2P ring LSP.

3. The method of claim 1, wherein the MP2P ring LSP comprises a bidirectional ring LSP for which any router within a ring network in which the MP2P ring LSP is established can operate as an ingress network device to source packet traffic into the MP2P ring LSP for transport to the egress network device of the MP2P ring LSP in an upstream direction and a downstream direction around the ring network.

4. The method of claim 1, wherein the first network device is one of a plurality of ingress network devices of the MP2P ring LSP.

5. The method of claim 1, wherein the P2MP egress identification message comprises an Internet Group Management Protocol (IGMP) membership report message.

6. The method of claim 1, further comprising:
in response to determining, by the first network device, that the interested receiver is no longer interested in receiving multicast traffic from the multicast source and no other interested receivers for the multicast source for the specific multicast group remain, sending, by the first network device, a P2MP leave message to leave the P2MP LSP, wherein sending the P2MP leave message comprises outputting the P2MP leave message into the MP2P ring LSP in the ring network for which the ingress network device of the P2MP LSP is the sole egress network device of the MP2P ring LSP.

7. The method of claim 6, wherein the P2MP leave message comprises an IGMP membership leave message.

8. A method comprising:
receiving, by a first network device in a ring network, a point-to-multipoint (P2MP) egress identification message to add a second network device in the ring network as an egress of a P2MP label switched path (LSP) for receiving multicast traffic from a multicast source for a specific multicast group for which the second network device has an interested receiver, wherein receiving the P2MP egress identification message comprises receiving the P2MP egress identification message on a multipoint-to-point (MP2P) ring LSP in the ring network for which the first network device is a sole egress network device of the MP2P ring LSP; and
updating, by the first network device and in response to receiving the P2MP egress identification message on the MP2P ring LSP, stored routing information to add the second network device as an egress network device of the P2MP LSP.

9. The method of claim 8, wherein updating the stored routing information comprises sending a resource reservation request message to add the second network device of the P2MP LSP.

10. The method of claim 9, further comprising:
in response to receiving the P2MP egress identification message, selecting, by the first network device, a direction of a ring network over which to send the resource reservation request message.

11. The method of claim 8, further comprising:
receiving, by the first network device, a P2MP leave message on the MP2P LSP; and
in response to receiving the P2MP leave message on the MP2P LSP, updating, by the first network device, a forwarding state of the first network device to remove the branch of the P2MP LSP that goes to the egress.

12. A first network device comprising:
a plurality of physical interfaces for receiving traffic from two or more network devices of a plurality of network devices in a ring network;
one or more processors configured to:
identify a first point-to-multipoint (P2MP) label switched path (LSP) for receiving multicast traffic from a multicast source for a specific multicast group for which the first network device has an interested receiver, wherein the first network device is to be an egress network device of the first P2MP LSP; and
send, to an ingress network device of the P2MP LSP, a first P2MP egress identification message to add the first network device as an egress network device of the first P2MP LSP, wherein to send the first P2MP egress identification message, the processor is further configured to output the first P2MP egress identification message into a multipoint-to-point (MP2P) ring LSP for which the ingress network device of the first P2MP LSP is a sole egress network device of the MP2P ring LSP.

13. The first network device of claim 12, wherein the one or more processors are further configured to:
receive a second point-to-multipoint (P2MP) egress identification message to add a different network device in the ring network as an egress of a second P2MP label switched path (LSP) for receiving multicast traffic from the multicast source for the specific multicast group for which the second network device has an interested receiver, wherein receiving the second P2MP egress identification message comprises receiving the second P2MP egress identification message on the MP2P ring LSP for which the first network device is the sole egress network device of the second MP2P ring LSP; and
in response to receiving the second P2MP egress identification message on the MP2P ring LSP, update stored routing information to add the second network device as an egress network device of the second P2MP LSP.

14. The first network device of claim 12, wherein, to send the first P2MP egress identification message, the processor is further configured to encapsulate the first P2MP egress identification message within an MPLS packet bearing an outer MPLS label associated with the first MP2P ring LSP.

15. The first network device of claim 12, wherein the first MP2P ring LSP comprises a bidirectional ring LSP for which any router within a ring network in which the first MP2P ring LSP is established can operate as an ingress network device to source packet traffic into the first MP2P ring LSP for transport to the egress network device of the first MP2P ring LSP in an upstream direction and a downstream direction around the ring network.

16. The first network device of claim 12, wherein the first network device is one of a plurality of ingress network devices of the first MP2P ring LSP.

17. The first network device of claim 12, wherein the first P2MP egress identification message comprises an Internet Group Management Protocol (IGMP) membership report message.

18. The first network device of claim 12, wherein the processor is further configured to send a P2MP leave message to leave the first P2MP LSP.

19. The first network device of claim 12, wherein the processor is further configured to:
determine that the first network device no longer includes the interested receiver; and
send a P2MP leave message to leave the P2MP LSP, wherein to send the P2MP leave message, the processor is configured to output the P2MP leave message into the MP2P ring LSP in the ring network for which the ingress network device of the P2MP LSP is the sole egress network device of the MP2P ring LSP.

20. The first network device of claim 18, wherein the P2MP leave message comprises an Internet Group Management Protocol (IGMP) membership leave message.

21. A first network device of a ring network comprising:
a plurality of physical interfaces for receiving traffic from two or more network devices of a plurality of network devices in a ring network;
one or more processors configured to:
receive a point-to-multipoint (P2MP) egress identification message to add a second network device in the ring network as an egress of a P2MP label switched path (LSP) for receiving multicast traffic from a multicast source for a specific multicast group for which the second network device has an interested receiver, wherein receiving the P2MP egress identification message comprises receiving the P2MP egress identification message on a multipoint-to-point (MP2P) ring LSP for which the first network device is a sole egress network device of the MP2P ring LSP; and
in response to receiving the P2MP egress identification message on the MP2P ring LSP, update stored routing information to add the second network device as an egress network device of the P2MP LSP.

22. The first network device of claim 21, wherein to update the stored routing information, the one or more processors are configured to send a resource reservation request message to add the second network device of the P2MP LSP.

23. The first network device of claim 21, wherein the one or more processors are further configured to select a direction of a ring network over which to send the resource reservation request message in response to receiving the P2MP egress identification message.

24. The first network device of claim 21, wherein the one or more processors are further configured to:
receive a P2MP leave message on the MP2P LSP; and
update a forwarding state of the first network device to remove the branch of the P2MP LSP that goes to the egress in response to receiving the P2MP leave message on the MP2P LSP.

25. A non-transitory computer readable storage medium of a network device storing instruction that cause a processor to:
identify a first point-to-multipoint (P2MP) label switched path (LSP) for receiving multicast traffic from a multicast source for a specific multicast group for which the network device of a ring network has an interested receiver, wherein the network device is to be an egress network device on the first P2MP LSP; and
send, to an ingress network device of the first P2MP LSP, a first P2MP egress identification message to add the network device as an egress network device of the first P2MP LSP, wherein to send the first P2MP egress identification message, the processor is further configured to output the first P2MP egress identification message into a multipoint-to-point (MP2P) ring LSP in the ring network for which the ingress network device of the first P2MP LSP is a sole egress network device of the MP2P ring LSP.

26. The computer-readable storage medium of claim 25, further comprising instructions that cause the processor to:
receive a second point-to-multipoint (P2MP) egress identification message to add a different network device as an egress of a second P2MP label switched path (LSP) for receiving multicast traffic from a multicast source for which the second network device has an interested receiver, wherein receiving the second P2MP egress identification message comprises receiving the second P2MP egress identification message on the multipoint-to-point (MP2P) ring LSP for which the network device is the sole egress network device of the MP2P ring LSP; and
in response to receiving the second P2MP egress identification message on the MP2P ring LSP, update stored routing information to add the different network device as an egress network device of the second P2MP LSP.

27. The computer-readable storage medium of claim 25, further comprising instructions that cause the processor to encapsulate the first P2MP egress identification message within an MPLS packet bearing an outer MPLS label associated with the MP2P ring LSP.

* * * * *